United States Patent
Yi et al.

(10) Patent No.: US 10,616,018 B2
(45) Date of Patent: *Apr. 7, 2020

(54) DATA RECEIVING METHOD AND APPARATUS SUPPORTING EXPANSION MODULATION SCHEME

(71) Applicant: LG Electronics Inc., Seoul (KR)

(72) Inventors: Yunjung Yi, Seoul (KR); Jonghyun Park, Seoul (KR); Suckchel Yang, Seoul (KR); Bonghoe Kim, Seoul (KR); Kijun Kim, Seoul (KR); Byounghoon Kim, Seoul (KR); Seungmin Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/020,551

(22) Filed: Jun. 27, 2018

(65) Prior Publication Data

US 2018/0324015 A1 Nov. 8, 2018

Related U.S. Application Data

(63) Continuation of application No. 15/038,129, filed as application No. PCT/KR2014/011593 on Nov. 28, 2014, now Pat. No. 10,015,031.

(Continued)

(51) Int. Cl.
*H04L 27/26* (2006.01)
*H04W 72/04* (2009.01)
(Continued)

(52) U.S. Cl.
CPC ........ *H04L 27/2602* (2013.01); *H04L 5/0053* (2013.01); *H04L 27/34* (2013.01); *H04W 72/042* (2013.01); *H04W 52/262* (2013.01)

(58) Field of Classification Search
CPC ..... H04L 27/2602; H04L 27/34; H04L 5/005; H04L 5/0053; H04W 72/02; H04W 72/04;
(Continued)

(56) References Cited

U.S. PATENT DOCUMENTS 8,724,648 B2   5/2014   Zeng et al.
8,897,202 B2   11/2014  Chen et al.
(Continued)

FOREIGN PATENT DOCUMENTS

EP   2434800 A1   3/2012
EP   2472974 A1   7/2012
(Continued)

OTHER PUBLICATIONS

R1-135472: LG Electronics, "Specification impact on DL signalling for 256QAM support," 3GPP TSG RAN WG1 #75, Internet, http://www.3gpp.org/ftp/tsg_ran/WG1_RL1/TSGR1_75/Docs, San Francisco, USA, Nov. 11-15, 2013, pp. 1-3.

(Continued)

*Primary Examiner* — Candal Elpenord
(74) *Attorney, Agent, or Firm* — Dentons US LLP (57) ABSTRACT

Provided are a data receiving method supporting an expansion modulation scheme and a wireless device using the same. The wireless device receives expansion sub-frame information indicating at least one expansion sub-frame supporting the expansion modulation scheme among a plurality of sub-frames and receives downlink data according to the expansion sub-frame information.

18 Claims, 5 Drawing Sheets

Related U.S. Application Data (60) Provisional application No. 61/910,101, filed on Nov. 28, 2013, provisional application No. 61/910,928, filed on Dec. 2, 2013, provisional application No. 61/910,966, filed on Dec. 3, 2013, provisional application No. 61/938,160, filed on Feb. 11, 2014, provisional application No. 61/948,032, filed on Mar. 5, 2014, provisional application No. 61/973,186, filed on Mar. 31, 2014, provisional application No. 61/994,143, filed on May 16, 2014, provisional application No. 62/034,812, filed on Aug. 8, 2014.

(51) Int. Cl.
*H04L 5/00* (2006.01)
*H04L 27/34* (2006.01)
*H04W 52/26* (2009.01)

(58) Field of Classification Search
CPC .. H04W 72/042; H04W 52/26; H04W 52/262
See application file for complete search history.

(56) References Cited

U.S. PATENT DOCUMENTS

| | | |
|---|---|---|
| 2011/0122825 A1 | 5/2011 | Lee et al. |
| 2012/0113920 A1 | 5/2012 | Cheng et al. |
| 2012/0170525 A1 | 7/2012 | Sorrentino |
| 2013/0016694 A1* | 1/2013 | Nimbalker ........ H04W 72/1289 370/330 |
| 2014/0192732 A1* | 7/2014 | Chen .................... H04L 1/0003 370/329 |
| 2015/0358111 A1* | 12/2015 | Marinier ............... H04L 1/0003 370/329 |
| 2016/0007357 A1* | 1/2016 | Yano ........................ H04L 1/00 370/329 |

FOREIGN PATENT DOCUMENTS

| | | |
|---|---|---|
| JP | 2012-530417 A | 11/2012 |
| WO | 2008/024890 A2 | 2/2008 |
| WO | 2008/109269 A2 | 9/2008 |
| WO | 2010/145185 A1 | 12/2010 |
| WO | 2013069984 A1 | 5/2013 |
| WO | 2013/123961 A1 | 8/2013 |
| WO | 2013135475 | 9/2013 |

OTHER PUBLICATIONS

R1-135655: Ericsson, "On standard impacts to support 256QAM in down link" 3GPP TSG RAN WG1 #75, Internet: http://www.3gp.org/ftp/tsg_ran/WG1_RL1/TSGR1_75/Docs/R1-135655.zip, San Francisco, USA, Nov. 11-15, 2013, pp. 1-3.

HTC, "On Small Cell Enhancement for Improved Spectral Efficiency," R1-130311, 3GPP TSG RAN WG1 Meeting #72, St. Julian's, Malta, Jan. 18, 2013, see pp. 1-4.

LG Electronics, "Specification impact of 256QAM support in downlink," R1-134401, 3GPP TSG RAN WG1 #74bis, Guangzhou, China, Sep. 28, 2013, see pp. 1-3.

Hitachi Ltd., "Evaluation on 256QAM in small cell scenario," R1-132652, 3GPP TSG-RAN WG1 #73, Fukuoka, Japan, May 21, 2013, see pp. 1-5.

Hitachi Ltd., "Further Evaluation and Discussion on 256QAM," R1-134764, 3GPP TSG RAN WG1 #74bis, Guangzhou, China, Sep. 28, 2013, see pp. 1-3.

* cited by examiner

FIG. 5

DATA RECEIVING METHOD AND APPARATUS SUPPORTING EXPANSION MODULATION SCHEME

This application is a Continuation of U.S. application Ser. No. 15/038,129, filed on May 20, 2016 now allowed, which is a 371 National Stage entry of International Application No. PCT/KR2014/011593 filed Nov. 28, 2014, and claims priority to U.S. Provisional Application Nos. 61/910,101 filed Nov. 28, 2013; 61/910,928 filed Dec. 2, 2013; 61/910,966 filed Dec. 3, 2013; 61/938,160 filed Feb. 11, 2014; 61/973,186 filed Mar. 31, 2014; 61/994,143 filed May 16, 2014; 62/034,812 filed Aug. 8, 2014 and 61/948,032 filed Mar. 5, 2014, all of which are hereby incorporated by reference in their entireties as if fully set forth herein.

BACKGROUND OF THE INVENTION

Field of the Invention

The present invention relates to wireless communications, and more particularly, to a data receiving method that supports higher modulation order and a wireless device using the same in wireless communication systems.

Related Art

Long Term Evolution (LTE)/LTE-advanced (LTE-A) based on 3rd Generation Partnership Project (3GPP) Technical Specification (TS) release 8-11 is a mobile communication standard which is widely used. Recently, the next generation mobile communication that has higher efficiency is under standardization.

In order to cope with increasing data traffic, various techniques that increase transmission capacity of mobile communication systems have been introduced. For example, it has been considered that Multiple Input Multiple Output (MIMO) technique that uses multiple antennas, carrier aggregation technique that supports multiple cells, higher order modulation scheme, and so on.

It is required to consider the compatibility with scenarios under various conditions and legacy devices in introducing new techniques.

SUMMARY OF THE INVENTION

The present invention relates to a data receiving method that supports higher modulation order and a wireless device using the same in wireless communication systems.

In an aspect, a method for receiving data in a wireless communication system is provided. The method includes receiving, by a wireless device, expansion subframe information indicating at least one expansion subframe in which expansion modulation scheme is supported among a plurality of subframes, receiving, by the wireless device, downlink control information that includes a modulation and coding scheme (MCS) field indicating the expansion modulation scheme on a downlink control channel, in the at least one expansion subframe, and receiving, by the wireless device, downlink data on a downlink shared channel according to the downlink control information.

The expansion subframe may support a modulation scheme that has modulation order of 8, and non-expansion subframe, which is not the expansion subframe among the plurality of subframes, may support a modulation scheme that has a modulation order of less than 8.

The MCS field may have different bit numbers in the expansion subframe and the non-expansion subframe.

In another aspect, a wireless device in a wireless communication system is provided. The wireless device includes a radio frequency (RF) unit configured to transmit and receive a radio signal, and a processor connected to the RF unit. The processor is configured to receive expansion subframe information indicating at least one expansion subframe in which expansion modulation scheme is supported among a plurality of subframes through the RF unit, receive downlink control information that includes a modulation and coding scheme (MCS) field indicating the expansion modulation scheme on a downlink control channel, in the at least one expansion subframe through the RF unit, and receive downlink data on a downlink shared channel according to the downlink control information through the RF unit.

Higher data rate may be supported in various environments.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS) release 8 or 3GPP LTE-advanced (LTE-A) based on 3GPP TS release 10. However, this is for exemplary purposes only, and thus the present invention is also applicable to various wireless communication networks. In the following description, LTE and/or LTE-A are collectively referred to as LTE.

The wireless device may be served by a plurality of serving cells. Each serving cell may be defined with a downlink (DL) component carrier (CC) or a pair of a DL CC and an uplink (UL) CC.

The serving cell may be classified into a primary cell and a secondary cell. The primary cell operates at a primary frequency, and is a cell designated as the primary cell when an initial network entry process is performed or when a network re-entry process starts or in a handover process. The primary cell is also called a reference cell. The secondary cell operates at a secondary frequency. The secondary cell may be configured after an RRC connection is established, and may be used to provide an additional radio resource. At least one primary cell is configured always. The secondary cell may be added/modified/released by using higher-layer signaling (e.g., a radio resource control (RRC) message).

A cell index (CI) of the primary cell may be fixed. For example, a lowest CI may be designated as the CI of the primary cell. It is assumed hereinafter that the CI of the primary cell is 0 and a CI of the secondary cell is allocated sequentially starting from 1.

Figure 1:
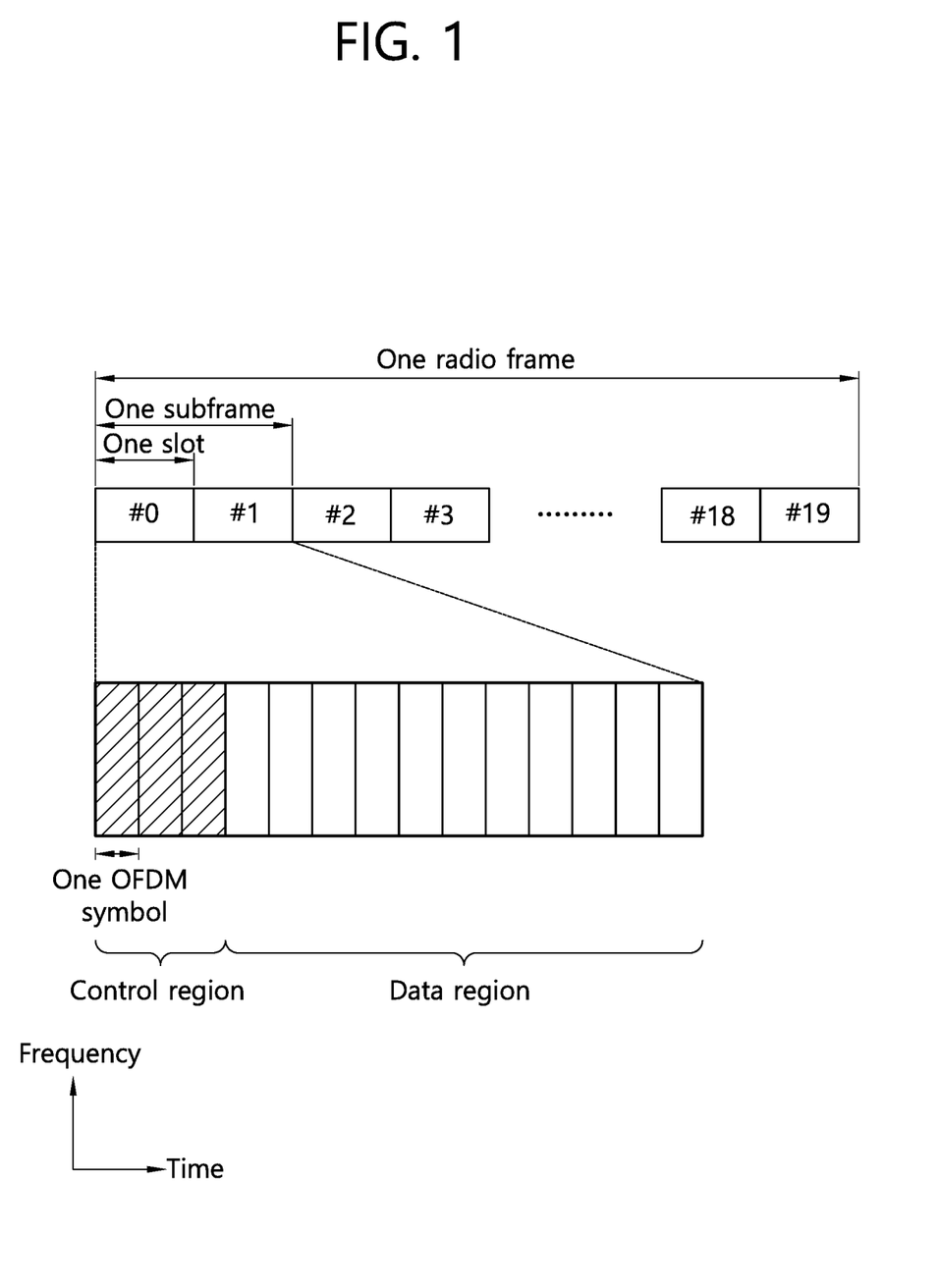
FIG. 1 illustrates a structure of a DL radio frame in 3GPP LTE.

FIG. 1 illustrates a structure of a DL radio frame in 3GPP LTE. The section 6 of 3GPP TS 36.211 V10.2.0 (June 2011) "Evolved Universal Terrestrial Radio Access (E-UTRA); Physical Channels and Modulation (Release 10)" may be incorporated herein by reference.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V 10.2.0, in case of a normal CP, one slot includes 7 OFDM symbols, and in case of an extended CR one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as master information block (MIB). In comparison thereto, system information transmitted on the PDCCH is referred to as system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

When a wireless device monitors the PDCCH based on C-RNTI, a DCI format and a search space are determined depending on a transmission mode of PDSCH. The following table shows examples of DCI format.

TABLE 1

| DCI format | Contents |
| --- | --- |
| DCI format 0 | Used in PUSCH scheduling |
| DCI format 1 | Used in scheduling of one PDSCH codeword |
| DCI format 1A | Used in compact scheduling of one PDSCH codeword and random access process |

TABLE 1-continued

| DCI format | Contents |
| --- | --- |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 3 | Used to transmit TPC command of PUCCH and PUSCH having 2 bit power adjustments |
| DCI format 3A | Used to transmit TPC command of PUCCH and PUSCH having 1 bit power adjustment |

The PDCCH is monitored in an area restricted to the control region in the subframe, and a cell specific reference signal (CRS) which is transmitted through full band is used for demodulating the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 2:
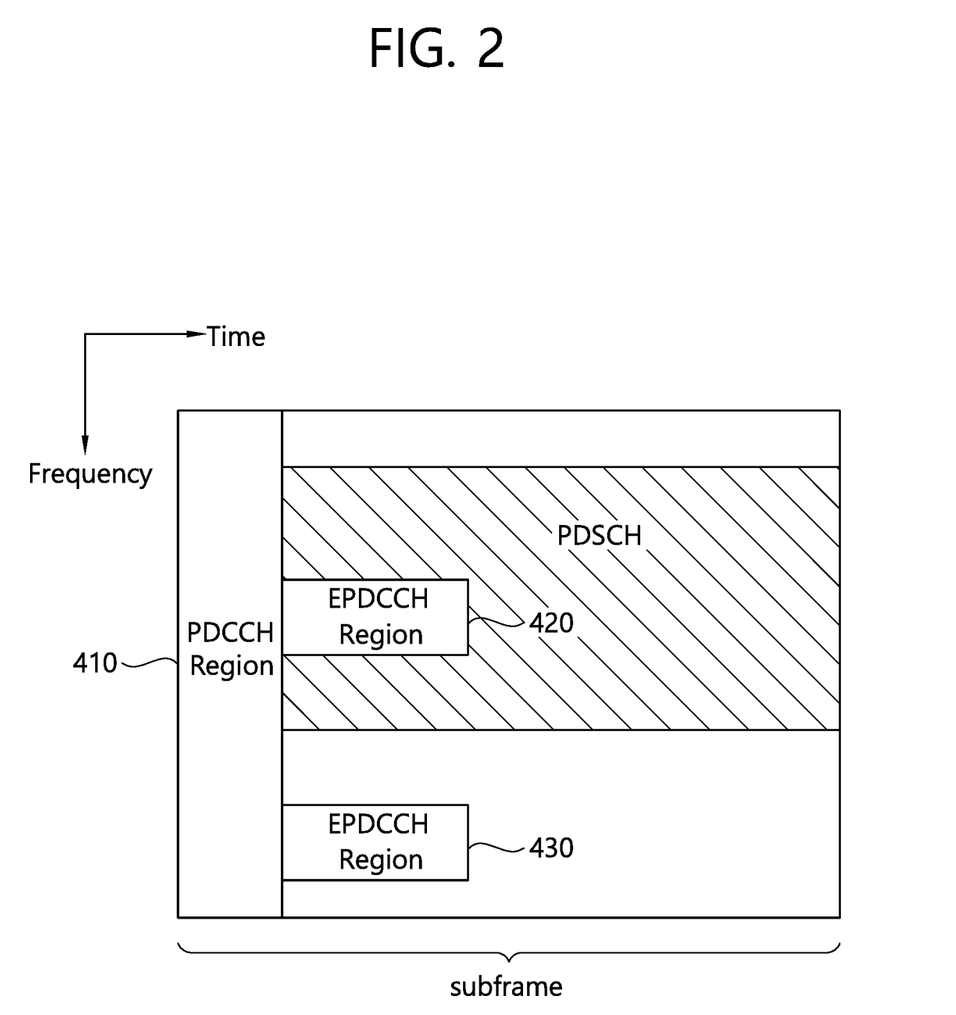
FIG. 2 is an example of a subframe that has an EPDCCH.

FIG. 2 is an example of a subframe that has an EPDCCH.

The subframe may include zero or one PDCCH region 410 and zero or more EPDCCH regions 420 and 430.

The EPDCCH regions 420 and 430 are regions in which a wireless device monitors the EPDCCH. The PDCCH region 410 is located in up to first four OFDM symbols of the subframe, whereas the EPDCCH regions 420 and 430 may be flexibly scheduled in an OFDM symbol located after the PDCCH region 410.

One or more EPDCCH regions 420 and 430 may be assigned to the wireless device. The wireless device may monitor EPDDCH data in the assigned EPDCCH regions 420 and 430.

The number/location/size of the EPDCCH regions 420 and 430 and/or information regarding a subframe for monitoring the EPDCCH may be reported by a BS to the wireless device by using a radio resource control (RRC) message or the like.

In the PDCCH region 410, a PDCCH may be demodulated on the basis of a CRS. In the EPDCCH regions 420 and 430, instead of the CRS, a DM-RS may be defined for demodulation of the EPDCCH. An associated DM-RS may be transmitted in the EPDCCH regions 420 and 430.

In a carrier aggregation environment in which a plurality of serving cells is configured, there are two scheduling schemes of a cross carrier scheduling and a non-cross carrier scheduling. In the non-cross carrier scheduling, PDCCH-PDSCH scheduling is performed in one serving cell, and in the cross carrier scheduling, PDCCH-PDSCH scheduling is performed in serving cells different from each other.

In the cross carrier scheduling, a serving cell in which the PDCCH/EPDCCH is received and a serving cell in which the PDSCH is scheduled may be different. A BS may notify whether the cross carrier scheduling is set to a wireless device. When the cross carrier scheduling is set, a DCI on the PDCCH/EPDCCH may include a carrier indicator field (CIF) that indicates a serving cell in which the PDSCH is scheduled. A cell in which the PDCCH/EPDCCH is scheduled is referred to as a scheduling cell, and a cell in which the PDSCH is scheduled is referred to as a scheduled cell.

Below are contents of Channel state information (CSI) reference signal (RS) that are extracted from 3GPP TS 36.211 V11.2.0 (February 2013), which is a reference of the present invention.

-----------------Start-------------------

Multiple CSI reference signal configurations can be used in a given cell. A UE can be configured with multiple sets of CSI reference signals,
    up to three configurations for which the UE shall assume non-zero transmission power for the CSI-RS, and
    zero or more configurations for which the UE shall assume zero transmission power.

The CSI-RS configurations for which the UE shall assume non-zero transmission power are provided by higher layers.

The CSI-RS configurations for which the UE shall assume zero transmission power in a subframe are given by a bitmap derived according to Section 7.2.7 in [4]. For each bit set to one in the 16-bit bitmap, the UE shall assume zero transmission power for the resource elements corresponding to the four CSI reference signal column in Tables 6.10.5.2-1 and 6.10.5.2-2 for normal and extended cyclic prefix, respectively, except for resource elements that overlap with those for which the UE shall assume non-zero transmission power CSI-RS as configured by higher layers. The most significant bit corresponds to the lowest CSI reference signal configuration index and subsequent bits in the bitmap correspond to configurations with indices in increasing order.

CSI reference signals can only occur in
    downlink slots where ns mode 2 fulfils the condition in Tables 6.10.5.2-1 and 6.10.5.2-2 for normal and extended cyclic prefix, respectively, and
    where the subframe number fulfils the conditions in Section 6.10.5.3.

The UE shall assume that CSI reference signals are not transmitted
    in the special subframe(s) in case of frame structure type 2,
    in subframes where transmission of a CSI-RS would collide with transmission of synchronization signals, PBCH, or SystemInformationBlockType1 messages,
    in the primary cell in subframes configured for transmission of paging messages in the primary cell for any UE with the cell-specific paging configuration.

-----------------End-------------------

Below are a part of sections 7.1.9, 7.1.10 and 7.2 that are extracted from 3GPP TS 36.213 V11.1.0 (December 2012), which is a reference of the present invention.

-----------------Start-------------------

7.1.9 PDSCH Resource Mapping Parameters

A UE configured in transmission mode 10 for a given serving cell can be configured with up to 4 parameter sets by higher layer signaling to decode PDSCH according to a detected PDCCH/EPDCCH with DCI format 2D intended for the UE and the given serving cell. The UE shall use the parameter set according to the value of the 'PDSCH RE Mapping and Quasi-Co-Location indicator' field (mapping defined in Table 7.1.9-1) in the detected PDCCH/EPDCCH with DCI format 2D for determining the PDSCH RE mapping (defined in Section 6.3.5 of [3]) and PDSCH antenna port quasi co-location (defined in Section 7.1.10). For PDSCH without a corresponding PDCCH, the UE shall use the parameter set indicated in the PDCCH/EPDCCH with DCI format 2D corresponding to the associated SPS activation for determining the PDSCH RE mapping (defined in Section 6.3.5 of [3]) and PDSCH antenna port quasi co-location (defined in Section 7.1.10).

The following parameters for determining PDSCH RE mapping and PDSCH antenna port quasi co-location are configured via higher layer signaling for each parameter set:
- 'Number of CRS antenna ports for PDSCH RE mapping'.
- 'CRS frequency shift for PDSCH RE mapping'.
- 'MBSFN subframe configuration for PDSCH RE mapping'.
- 'Zero-power CSI-RS resource configuration for PDSCH RE mapping'.
- 'PDSCH starting position for PDSCH RE mapping'.
- 'CSI-RS resource configuration identity for PDSCH RE mapping'.

A UE configured in transmission mode 10 for a given serving cell can be configured with a parameter set selected from the four parameter sets in Table 7.1.9-1 by higher layer signaling for determining the PDSCH RE mapping (defined in Section 6.3.5 of [3]) and PDSCH antenna port quasi co-location (defined in Section 7.1.10) to decode PDSCH according to a detected PDCCH/EPDCCH with DCI format 1A intended for the UE and the given serving cell. The UE shall use the configured parameter set, determining the PDSCH RE mapping (defined in Section 6.3.5 of [3]) and PDSCH antenna port quasi co-location (defined in Section 7.1.10) for decoding PDSCH corresponding to detected PDCCH/EPDCCH with DCI format 1A and PDSCH without a corresponding PDCCH associated with SPS activation indicated in PDCCH/EPDCCH with DCI format 1A.

7.1.10 Antenna Ports Quasi Co-Location for PDSCH

A UE configured in transmission mode 1-10 may assume the antenna ports 0-3 of a serving cell are quasi co-located (as defined in [3]) with respect to delay spread, Doppler spread, Doppler shift, average gain, and average delay.

A UE configured in transmission mode 8-10 may assume the antenna ports 7-14 of a serving cell are quasi co-located (as defined in [3]) for a given subframe with respect to delay spread, Doppler spread, Doppler shift, average gain, and average delay.

A UE configured in transmission mode 1-9 may assume the antenna ports 0-3, 5, 7-22 of a serving cell are quasi co-located (as defined in [3]) with respect to Doppler shift, Doppler spread, average delay, and delay spread.

A UE configured in transmission mode 10 is configured with one of two quasi co-location types by higher layer signaling to decode PDSCH according to transmission scheme associated with antenna ports 7-14:
- Type A: The UE may assume the antenna ports 0-3, 7-22 of a serving cell are quasi co-located (as defined in [3]) with respect to delay spread, Doppler spread, Doppler shift, and average delay
- Type B: The UE may assume the antenna ports 15-22 corresponding to the CSI-RS resource configuration identified by 'CSI-RS resource configuration identity for PDSCH RE mapping' in Section 7.1.9 and the antenna ports 7-14 associated with the PDSCH are quasi co-located (as defined in [3]) with respect to Doppler shift, Doppler spread, average delay, and delay spread.

7.2 UE Procedure for Reporting Channel State Information (CSI)

The time and frequency resources that can be used by the UE to report CSI which consists of channel quality indicator (CQI), precoding matrix indicator (PMI), precoding type indicator (PTI), and/or rank indication (RI) are controlled by the eNB. For spatial multiplexing, as given in [3], the UE shall determine a RI corresponding to the number of useful transmission layers. For transmit diversity as given in [3], RI is equal to one.

A UE in transmission mode 8 or 9 is configured with or without PMI/RI reporting by the higher layer parameter pmi-RI-Report.

A UE in transmission mode 10 can be configured with one or more CSI processes per serving cell by higher layers. Each CSI process is associated with a CSI-RS resource (defined in Section 7.2.5) and a CSI-interference measurement (CSI-IM) resource (defined in Section 7.2.6). A CSI reported by the UE corresponds to a CSI process configured by higher layers. Each CSI process can be configured with or without PMI/RI reporting by higher layer signalling.

A UE is configured with resource-restricted CSI measurements if the subframe sets $C_{CSI,0}$ and $C_{CSI,1}$ are configured by higher layers.

CSI reporting is periodic or aperiodic.

If the UE is configured with more than one serving cell, it transmits CSI for activated serving cell(s) only.

If a UE is not configured for simultaneous PUSCH and PUCCH transmission, it shall transmit periodic CSI reporting on PUCCH as defined hereafter in subframes with no PUSCH allocation.

If a UE is not configured for simultaneous PUSCH and PUCCH transmission, it shall transmit periodic CSI reporting on PUSCH of the serving cell with smallest ServCellIndex as defined hereafter in subframes with a PUSCH allocation, where the UE shall use the same PUCCH-based periodic CSI reporting format on PUSCH.

A UE shall transmit aperiodic CSI reporting on PUSCH if the conditions specified hereafter are met. For aperiodic CQI/PMI reporting, RI reporting is transmitted only if the configured CSI feedback type supports RI reporting.

For serving cell c, a UE configured in transmission mode 10 with PMI/RI reporting for a CSI process can be configured with a 'RI-reference CSI process'. If the UE is configured with a 'RI-reference CSI process' for the CSI process, the reported RI for the CSI process shall be the same as the reported RI for the configured 'RI-reference CSI process'. The UE is not expected to receive an aperiodic CSI report request for a given subframe triggering a CSI report including CSI associated with the CSI process and not including CSI associated with the configured 'RI-reference CSI process'.

For a UE in transmission mode 10, in case of collision between CSI reports of same serving cell with PUCCH reporting type of the same priority, and the CSI reports corresponding to different CSI processes, the CSI reports corresponding to all CSI processes except the CSI process with the lowest CSIProcessIndex are dropped.

If the UE is configured with more than one serving cell, the UE transmits a CSI report of only one serving cell in any given subframe. For a given subframe, in case of collision of a CSI report with PUCCH reporting type 3, 5, 6, or 2a of one serving cell with a CSI report with PUCCH reporting type 1, 1a, 2, 2b, 2c, or 4 of another serving cell, the latter CSI with PUCCH reporting type (1, 1a, 2, 2b, 2c, or 4) has lower priority and is dropped. For a given subframe, in case of collision of CSI report with PUCCH reporting type 2, 2b, 2c, or 4 of one serving cell with CSI report with PUCCH reporting type 1 or 1a of another serving cell, the latter CSI report with PUCCH reporting type 1, or 1a has lower priority and is dropped.

For a given subframe and UE in transmission mode 1-9, in case of collision between CSI reports of different serving cells with PUCCH reporting type of the same priority, the CSI of the serving cell with lowest ServCellIndex is reported, and CSI of all other serving cells are dropped.

For a given subframe and UE in transmission mode 10, in case of collision between CSI reports of different serving cells with PUCCH reporting type of the same priority and the CSI reports corresponding to CSI processes with same CSIProcessIndex, the CSI reports of all serving cells except the serving cell with lowest ServCellIndex are dropped.

For a given subframe and UE in transmission mode 10, in case of collision between CSI reports of different serving cells with PUCCH reporting type of the same priority and the CSI reports corresponding to CSI processes with different CSIProcessIndex, the CSI reports of all serving cells except the serving cell with CSI reports corresponding to CSI process with the lowest CSIProcessIndex are dropped.

-----------------End-------------------

Hereinafter, a method for supporting an expansion modulation scheme which is proposed will be described.

3GPP LTE supports a modulation order of maximum 6, and modulation schemes of quadrature phase shift keying (QPSK), 16-quadrature amplitude modulation (QAM), and 64-QAM.

However, it has been considered to support modulation orders of 7 or higher (e.g., 128-QAM, 256-QAM, 1024-QAM, etc.) in order to improve the frequency efficiency. Hereinafter, the modulation scheme that has a higher modulation order than that of the modulation scheme which is supported in 3GPP LTE is referred to the expansion modulation scheme.

Figure 3:
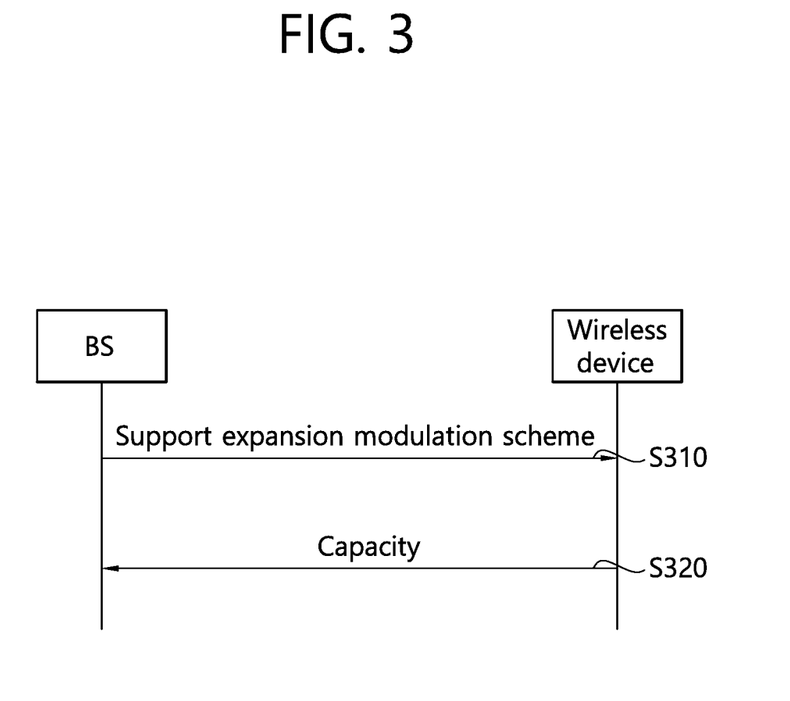
FIG. 3 illustrates a communication method according to an embodiment of the present invention.

FIG. 3 illustrates a communication method according to an embodiment of the present invention.

In step S310, a BS sends a support message that notifies whether the expansion modulation scheme is used to a wireless device. The support message may be transmitted via system information or an RRC message. The support message may include information on whether the expansion modulation scheme is supported and information on period/resource supported by the expansion modulation scheme.

In step S320, the wireless device sends a capability message that notifies that the wireless device is available to support the expansion modulation scheme to the BS.

The expansion modulation scheme may be supported for each frequency band or each frequency band group. Otherwise, the expansion modulation scheme may be supported for each frequency resource or each RB. When a plurality of frequency bands is configured, the expansion modulation scheme may be supported for each or a combination of the plurality of frequency bands. The support message or the capability message may include the information on a frequency band (or a combination of frequency bands) in which the expansion modulation scheme is supported.

The expansion modulation scheme may be supported per each serving cell. For example, although a primary cell does not support the expansion modulation scheme, one of secondary cells may support the expansion modulation scheme. When the primary cell configures the secondary cell, the primary cell may notify whether the corresponding secondary cell supports the expansion modulation scheme to the wireless device.

When the cross carrier scheduling is configured, if the scheduled cell supports the expansion modulation scheme, the corresponding DCI may include the information on the expansion modulation scheme, even though the scheduled cell does not support the expansion modulation scheme.

If the primary cell supports the expansion modulation scheme, the secondary cell may be defined to support the expansion modulation scheme without any separate configuration.

When the expansion modulation scheme is configured, it becomes problematic to use the channel quality indicator (CQI) table to which modulation and coding scheme (MCS) table is related for the CQI report. That is whether a legacy CQI table related to a legacy MCS table in which the expansion modulation scheme is not considered is utilized or an expansion CQI table related to an expansion MCS table in which the expansion modulation scheme is considered is utilized. The expansion MCS table may include a MCS table that has an index indicating the expansion modulation scheme (e.g., 256-QAM) in addition to the existing modulation scheme. Furthermore, the expansion CQI table may include a CQI table that has an index indicating the expansion modulation scheme (e.g., 256-QAM) in addition to the existing modulation scheme. If the expansion modulation scheme is configured, the wireless device may configure the expansion CQI table related to the expansion MCS table to use for the CQI report. In another embodiment, the BS may notify whether the expansion MCS table is used to the wireless device separately from whether the expansion modulation scheme is supported. In other words, although the BS itself does not support the expansion modulation scheme, the BS may configure whether to use the expansion MCS/CQI table to the wireless device. This may be used for another BS to use the expansion modulation scheme in case that any one BS does not support the expansion modulation scheme in a situation that BSs are required to cooperate such as the CoMP. The wireless device may report the channel quality indicator of 4 bits or 5 bits. The bit number of CQI may be determined according to a duplex mode of the corresponding cell. For example, a frequency division duplex (FDD) cell that supports FDD may use the CQI of 5 bits. A time division duplex (TDD) cell that supports TDD may use the CQI of 4 bits. In case of the TDD cell, the expansion MCS table may not be used, and in case of the FDD cell, the expansion MCS table may be used.

A dual connectivity environment refers to a case in which a plurality of accesses (e.g. a first access is a macro cell and a second access is a micro cell) is configured. In this case, each access is performed in each cell independently, which is different from the CA in which a configuration of a secondary cell is performed by a primary cell. Whether to support the expansion modulation scheme may be notified to the wireless device for each access. If the dual connectivity and the CA are simultaneously configured, the method described above may be applied to a cell for the CA.

Now, the support of the expansion modulation scheme in the CoMP environment will be described.

Hereinafter, the CoMP means cooperation between transmission points (TPs) that are geographically remote. The set of TPs that participate in a data transmission to the wireless device refers to a CoMP set.

Whether to support the expansion modulation scheme and/or whether to use the expansion MCS table may be notified to the wireless device for each TP.

When a CoMP operation is configured to the wireless device, a plurality of TPs may be configured. Whether the expansion modulation scheme is supported may be notified to the wireless device for each TP. Depending on whether the expansion modulation scheme is supported, a bit number of MCS fields in DCI may be changed. For example, if the expansion modulation scheme is supported, MCS fields of 6 bits are used, and if the expansion modulation scheme is not supported, MCS fields of 5 bits may be used.

In case of the PDCCH, a bit number of MCS fields may be determined depending on whether the expansion modulation scheme is supported in a serving cell (e.g. a scheduled cell). For example, if a serving cell supports the expansion modulation scheme, MCS fields of 6 bits may be used, and if a serving cell does not support the expansion modulation scheme, MCS fields of 5 bits may be used. The same rule may be applied to the MCS table for the CQI report. If a serving cell supports the expansion modulation scheme regardless of a TP, the wireless device may assume that all TPs use the MCS table that has the expansion modulation scheme.

In case of the EPDCCH, whether to use the MCS field/MCS table that supports the expansion modulation scheme may be configured by a PDSCH remapping and quasi co-location indicator (PQI) which is related to the corresponding EPDCCH set. For example, if the first entry of a PQI table is related to a first EPDCCH set and the first entry instructs to use the expansion MCS table, the wireless device may expect that DCI of the corresponding EPDCCH set supports the expansion modulation scheme. If there is an ambiguity among a plurality of EPDCCH sets, the wireless device may follow the set of the first EPDCCH set. If the first EPDCCH set supports the expansion modulation scheme, the wireless device may assume that the remaining EPDCCH sets also support the expansion modulation scheme. The DCI format on the EPDCCH is DCI format 1x/2y. Since DCI format 1A is used only for a legacy device, if a use of the expansion modulation scheme is configured, it may be expected that the MCS field including the expansion modulation scheme may be used in DCI formats except DCI format 1A.

Whether to support the expansion modulation scheme may be dynamically determined for each PDSCH. When transmission mode 10 is used in 3GPP LTE, DCI format 2D has the PQI of 2 bits. This means that the PQI has four PQI entries. When it is assumed that a PQI entry indicates whether to support the expansion modulation scheme, it may be assumed that the corresponding PQI entry indicates whether a PDSCH supports the expansion modulation scheme. For example, if the related PQI entry supports the expansion modulation scheme, it may be interpreted that the MCS of a scheduled PDSCH is based on the MCS table that supports the expansion modulation scheme. This may be interpreted that whether to support the expansion modulation scheme may be signaled through the PQI entry. If a configuration of the expansion modulation scheme is given by non-zero-power (NZP) channel state information (CSI)-reference signal (RS) configuration, the wireless device may determine whether the expansion modulation scheme is supported using the NZP CSI-RS configuration in the PQI entry. According to a CSI configuration related to the corresponding NZP CSI-RS configuration, whether the expansion MCS table is used may also be determined. This means which MCS table (expansion or legacy) is to be used may be configured when configuring the CSI.

When the wireless device is configured with transmission mode 10 and DCI format 1A is used, the following matters may be considered. Hereinafter, it is assumed that the first PQI entry indicates whether the expansion modulation scheme is supported.

A. Regardless of whether the corresponding subframe is multicast-broadcast single-frequency network (MBSFN) subframe or non-MBSFN subframe, DCI format 1A uses the legacy MCS table. Regardless of the indication of the first PQI entry, the wireless device may ignore the support of the expansion modulation scheme in DCI format 1A.

B. MBSFN subframe follows an instruction of the first PQI entry, and non-MBSFN subframe ignores the support of the expansion modulation scheme.

C. If DCI format 1A is scheduled in a common search space, the support of the expansion modulation scheme is ignored (i.e., use the legacy MCS table). Otherwise, an instruction of the first PQI table is followed.

D. If DCI format 1A is scheduled in a common search space, the support of the expansion modulation scheme is ignored. Otherwise, MBSFN subframe follows an instruction of the first PQI entry, and non-MBSFN subframe ignores the support of the expansion modulation scheme.

E. According to 3GPP TS 36.213, type A and type B are defined for quasi co-location (QCL) operation in transmission mode 10. If the wireless device is configured with QCL type A, the support of the expansion modulation scheme is ignored. If the wireless device is configured with QCL type B, one of the methods B, C and D may be followed. During an RRC reconfiguration operation, it is assumed that the QCL operation is according to QCL type A. Accordingly, if the first PQI entry indicates the support of the expansion modulation scheme and is configured to follow an instruction of the first PQI entry for DCI format 1A of the MBSFN subframe, the wireless device may not expect to receive DCI format 1A in the MBSFN subframe during the RRC reconfiguration operation.

The proposed method may also applied to other DCI format similar to DCI format 2D. For example, if the wireless device is configured with QCL type A, the wireless device may use the same configuration for the expansion modulation scheme for all TPs (or all serving cells). The RRC configuration or the first NZP CSI-RS index may be used in order to activate the expansion modulation scheme. The configuration of the expansion modulation scheme may be given only for the case that QCL type B is configured to the wireless device. If QCL type A is configured, the wireless device may ignore the configuration of the expansion modulation scheme. When the configuration of the expansion modulation scheme is not given, the RRC configuration may be used as a default configuration. If the expansion MCS table is configured for each PQI entry and QCL type A is configured, the wireless device may follow an instruction of the first PQI entry. During the CSI process, the wireless device may follow the CSI configuration for the expansion modulation scheme. If QCL type A is configured, the wireless device may apply the MCS table determination for the CQI report to the NZP CSI-RS configuration. That is, the MCS table for the PDSCH may be determined based on the PQI entry, and the MCS table for the CQI table may be determined based on the ZP CSI-RS configuration.

The semi-persistent scheduling (SPS) may also support the expansion modulation scheme. If the expansion modulation scheme is configured, higher modulation order (e.g., 256-QAM) may be applied to an SPS transmission.

Whether to support the expansion modulation scheme may be given by a specific indicator (e.g., PQI entry), and the specific indicator may indicate at least one of the followings: (1) Whether the TP supports the expansion modulation scheme, (2) whether the MCS field in DCI supports the expansion modulation scheme, and (3) whether the expansion MCS table is used for the CQI report.

For the CSI report, the same rule may be used for calculating CQI. For example, for each CSI process related to the CSI-RS resource, whether the CQI is determined based on the expansion CQI table or the legacy CQI table may be configured. For each CSI process, whether the expansion modulation scheme is supported may be configured. When the expansion CQI table is used for the CQI report, a bit number for the CQI report may be determined based on a CP length of the configured CSI-RS resource. If the CSI process of a TP that has normal CP is configured to support the expansion modulation scheme, the CQI of 5 bits may be reported. Otherwise, the CQI of 4 bits may be reported. Even though TPs of duplex modes different from each other is configured for the CQI report for a CoMP operation, the rules same as the case of the CA may be applied. For example, a TDD TP may use the CQI based on the legacy CQI table always regardless of whether the expansion modulation scheme is supported.

The above described embodiment may be applied to any cases of an ideal backhaul or a non-ideal backhaul in the CoMP operation.

An enhanced interference mitigation and traffic adaptation (eIMTA) is a technique that efficiently improves traffic load and interference mitigation by dynamically changing a UL-DL configuration in TDD. Configuration of the eIMTA means that the BS may dynamically change a UL-DL configuration shown in the table below or may change a UL-DL configuration shown in the table below into an arbitrary UL-DL configuration to the wireless device.

TABLE 2

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the table above, 'D' represents a DL subframe, 'U' represents a UL subframe and 'S' represents an S subframe. S subframe may also be represented as a DL subframe. If the wireless device receives a UL-DL configuration from the BS, the wireless device may detect which frame is the DL subframe or the UL subframe according to a configuration of radio frame.

The change of UL-DL configuration may be performed through system information (e.g., master information block (MIB) or system information block (SIB)), an RRC message or DCI. The DL subframes that are not changeable through configurations, that is, entirely fixed to DL are referred to fixed DL subframes, and the DL subframes that are changeable through configurations and accordingly, in which DL/UL subframes are coexisted with respect to neighboring cells are referred to flexible DL subframes. That is, in the flexible DL subframes, although a specific cell may be a DL subframe, another cell may be a UL subframe. Otherwise, in the flexible DL subframes, although it may be a DL subframe on a moment, it may be a UL subframe in other times.

For a wireless device to which the eIMTA is configured, whether to support the expansion modulation scheme may be given as follows.

(1) Regardless of DL-UL configurations, once the expansion modulation scheme is configured, all DL subframes support the expansion modulation scheme.

(2) According to DL-UL configurations, only fixed DL subframes or S subframe supports the expansion modulation scheme.

(3) For the flexible DL subframes, whether to support the expansion modulation scheme is separately configured.

Owing to UL transmissions of neighboring devices, the flexible DL subframes have higher interference level in comparison with the fixed DL subframes. Accordingly, it may be beneficial to inactivate the expansion modulation scheme to the flexible DL subframes. For each subframe type, whether to support the expansion modulation scheme may be configured. For each subframe type, the MCS and/or CQI tables different from each other may be configured.

When the MCS tables (or the CQI tables) different from each other are used, a differential CQI may be considered. For example, in periodic CQI report, in case that each measurement set is configured in 200 ms window, the CQI may be calculated for each measurement set. Since interference conditions undergone for each measurement set are different, it may be efficient to have the MCS and/or CQI tables different from each other for each measurement set. Considering the eIMTA and/or an enhanced inter-cell interference coordination (eICIC) and/or a dynamic interference condition, different MCS and/or CQI tables may be configured for each subframe set.

Whether to use the expansion MCS table may be determined based on a UL subframe set. For example, a UL subframe set that has better interference condition uses the CQI of 5 bits (i.e., the expansion MCS table may be applied). A UL subframe that has not good interference condition uses the CQI of 4 bits (i.e., the legacy MCS table may be applied).

If an FDD UL band is used for a DL transmission of a small cell, the application of the expansion modulation scheme in the UL band may be limited due to high interference level caused by a UL transmission. In this case, separate signaling may be required for the application of the expansion modulation scheme. Separate CSI measurement set may be configured for a DL transmission in the UL band, and whether to support the expansion modulation scheme may be notified to the CSI measurement set.

Figure 4:
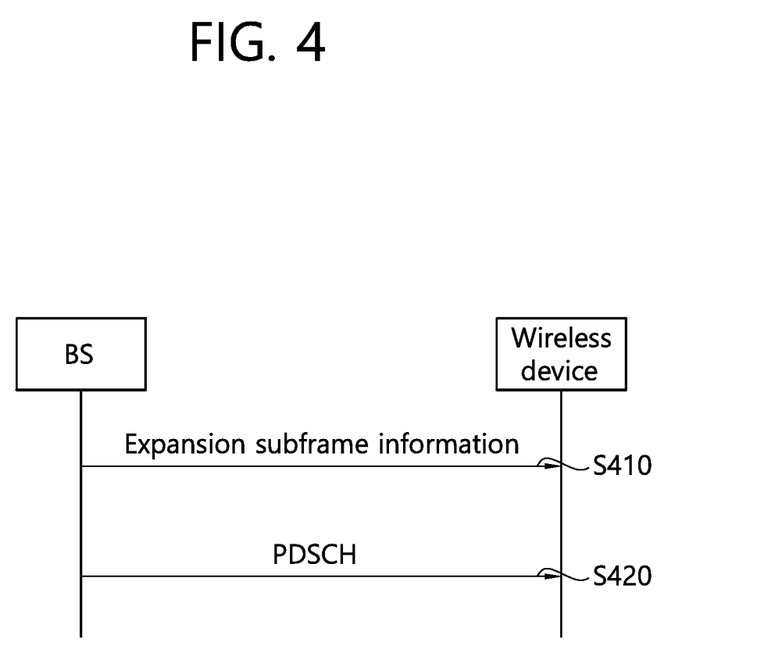
FIG. 4 illustrates a method for receiving data according to an embodiment of the present invention.

FIG. 4 illustrates a method for receiving data according to an embodiment of the present invention. This method may be performed after the embodiment of FIG. 3 is performed.

In step S410, a BS sends the expansion subframe information to a wireless device. The expansion subframe information includes information on a subframe or subframe set in which the expansion modulation scheme is supported. The expansion subframe refers to a subframe in which the expansion modulation scheme is supported, and non-expansion subframe refers to a legacy subframe in which the expansion modulation scheme is not supported.

For each of a plurality of subframe sets, the support of the expansion modulation scheme may be configured. For example, for each of the fixed subframe set and the flexible subframe set of the eIMTA, whether to support the expansion modulation scheme may be configured. Otherwise, whether to support the expansion modulation scheme may be configured for each measurement set. Or, for each of the MBSFN subframe set and/or the non-MBSFN subframe, whether to support the expansion modulation scheme may be configured.

Although the support of the expansion modulation scheme is available, if separate subframe set is not given, the wireless device may expect that the expansion modulation scheme is supported for all subframes. If separate subframe set available to support the expansion modulation scheme is given, the wireless device may expect that the expansion modulation scheme is supported for the corresponding subframe set.

For transmission modes 1 to 9, one MCS and/or CQI table may be configured for each measurement set. If the expansion MCS and/or CQI table is configured for one measurement set, the wireless device may assume that the expansion modulation scheme is also supported for the subframe that is not belonged to the one measurement set. Otherwise, the wireless device may assume that the expansion modulation scheme is not supported for the subframe that is not belonged to the one measurement set.

In more particular, for transmission modes 1 to 9, one CQI table may be configured for each measurement set. If the expansion CQI table is configured for one measurement set, the wireless device may assume that the expansion modulation scheme is also supported for the subframe that is not belonged to the one measurement set. Otherwise, the wireless device may assume that the expansion modulation scheme is not supported for the subframe that is not belonged to the one measurement set. In more particular, for transmission modes 1 to 9, one CQI table may be configured for each measurement set. If the expansion CQI table is configured for one measurement set, the wireless device may assume that the expansion modulation scheme is applied to all subframes for a DL transmission.

Or, differently, in transmission modes 1 to 9, one MCS table may be configured for each subframe measurement set. This MCS table may correspond to the CQI table for the same subframe set. If at least one subframe measurement set is configured to have the expansion modulation scheme, the expansion MCS table and/or the expansion CQI table may be used for the subframe that is belonged to each subframe set. If at least one subframe measurement set is configured not to have the expansion modulation scheme, a use of the legacy MCS table and/or the legacy CQI table may be regarded for the subframe that is belonged to each subframe set.

In step S420, the wireless device receives the PDSCH to which the expansion modulation scheme is applied in an expansion subframe.

Now, the application of the expansion modulation scheme in a hybrid automatic repeat request (HARQ) will be described.

For the HARQ that has the same HARQ process number, the support of the expansion modulation scheme may be maintained. If the expansion modulation scheme is supported in an initial transmission, the expansion modulation scheme is also supported in a retransmission. Accordingly, whether the expansion modulation scheme is supported in a retransmission may be determined depending on whether the expansion modulation scheme is supported in an initial transmission. Whether the expansion MCS table is used in a retransmission is determined depending on whether the expansion MCS table is used in an initial transmission.

In an SPS transmission, the support of the expansion modulation scheme may be maintained depending on whether the expansion modulation scheme is supported in an SPS allocation which is the most recently allocated. If the most recent SPS allocation supports the expansion modulation scheme, the later SPS transmission may also support the expansion modulation scheme.

The table below is an MCS table which is used for a PDSCH allocation within DCI, in 3GPP LTE. The DCI has MCS fields of 5 bits.

TABLE 3

| MCS index | Modulation order |
|---|---|
| 0 | 2 |
| 1 | 2 |
| 2 | 2 |
| 3 | 2 |

TABLE 3-continued

| MCS index | Modulation order |
|---|---|
| 4 | 2 |
| 5 | 2 |
| 6 | 2 |
| 7 | 2 |
| 8 | 2 |
| 9 | 2 |
| 10 | 4 |
| 11 | 4 |
| 12 | 4 |
| 13 | 4 |
| 14 | 4 |
| 15 | 4 |
| 16 | 4 |
| 17 | 6 |
| 18 | 6 |
| 19 | 6 |
| 20 | 6 |
| 21 | 6 |
| 22 | 6 |
| 23 | 6 |
| 24 | 6 |
| 25 | 6 |
| 26 | 6 |
| 27 | 6 |
| 28 | 6 |
| 29 | 2 |
| 30 | 4 |
| 31 | 6 |

If the MCS table is reused for the expansion modulation scheme and MCS fields are 5 bits, there is no ambiguity in DCI interpretation. For this, it may be implemented that at least one of MCS indexes 0 to 31 indicates modulation order 8. For example, it may be implemented that MCS index 31 or 39 indicates modulation order 8.

Optionally, a specific MCS index may indicate different modulation orders depending on whether the expansion modulation scheme is supported. For example, MCS indexes 29 to 31 in Table 3 above may be configured as follows. MCS indexes and modulation order are shown just for example.

TABLE 4

| MCS index | 256-QAM is not supported | 256-QAM is supported |
|---|---|---|
| 29 | 2 | 4 |
| 30 | 4 | 6 |
| 31 | 6 | 8 |

If an initial transmission in which 256-QAM is supported is started, in the later retransmission, MCS indexes 29 to 31 may also be interpreted as modulation order 4, 6 and 8, respectively. If an initial transmission in which 256-QAM is not supported is started, in the later retransmission, MCS indexes 29 to 31 may also be interpreted as modulation order 2, 4 and 6, respectively. If one of MCS indexes 0 to 28 is used in an initial transmission but whether the expansion modulation scheme is supported is not separately configured, it becomes problematic which MCS table is used in retransmission. So far as not being separately designated, in retransmission, MCS indexes 29 to 31 may be interpreted as modulation order 2, 4 and 6, respectively, similar to the conventional case.

An MCS index that indicates the expansion modulation scheme may be added to the MCS table, and MCS fields may be configured as 6 bits. This means that a bit number of MCS fields within DCI is changed depending on whether to support the expansion modulation scheme. If a subframe supports the expansion modulation scheme, the DCI monitored in the corresponding subframe may be configured to have MCS fields of 6 bits.

Now, the eIMTA will be considered together with a retransmission. If the expansion modulation scheme is supported and MCS fields of 6 bits are used, the expansion modulation scheme may be used in all subframes (or all expansion subframes). If MCS fields of 5 bits are used for supporting the expansion modulation scheme, the MCS fields may be interpreted according to a HARQ process number and/or a new data indicator (NDI). In non-MBSFN subframe, it may be implemented that DCI format 1A supports only the legacy MCS table such that low SINR range is increased and large packet size is supported.

Figure 5:
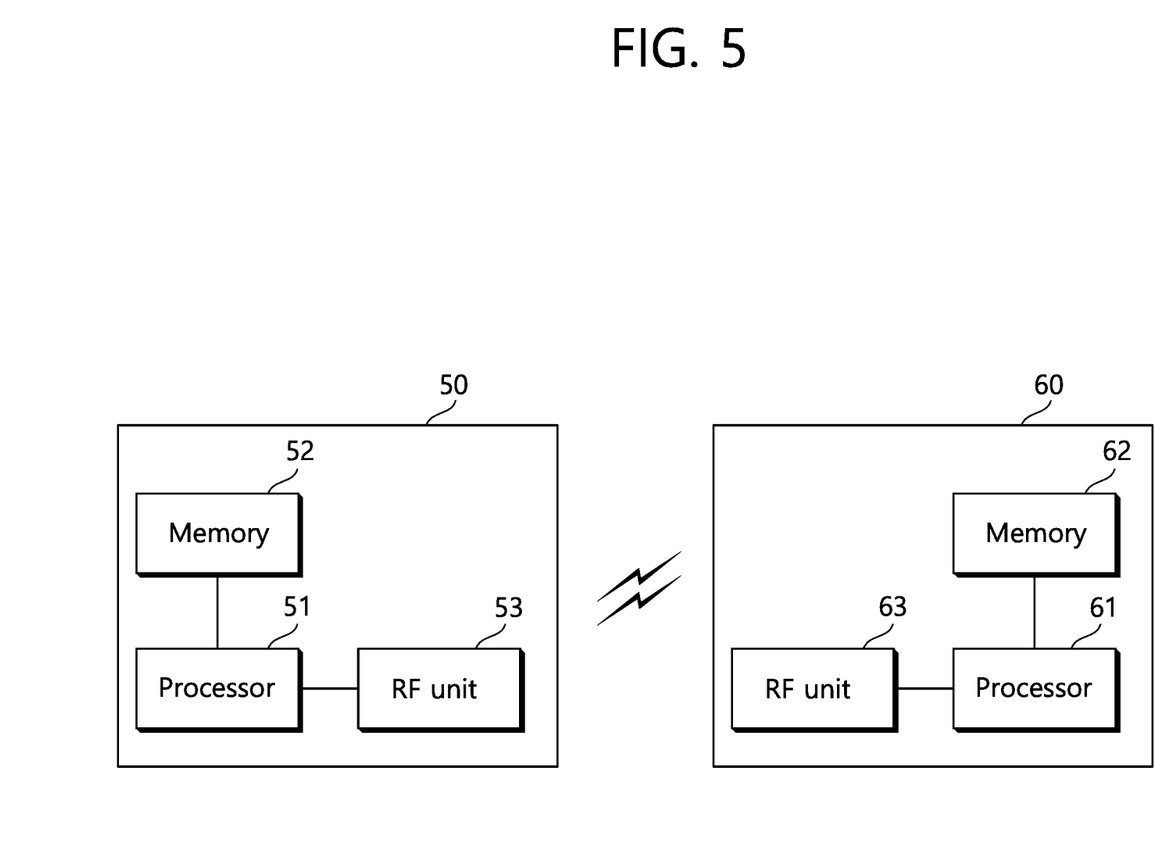
FIG. 5 is a block diagram illustrating a wireless communication system in which the embodiment of the present invention is implemented.

FIG. 5 is a block diagram showing wireless communication system to implement an embodiment of the present invention.

A BS 50 includes a processor 51, a memory 52 and a radio frequency (RF) unit 53. The memory 52 is operatively coupled with the processor 51 and stores a variety of commands to operate the processor 51. The RF unit 53 is operatively coupled with the processor 51, and transmits and/or receives a radio signal. The processor 51 is configured to implement proposed functions, procedures and/or methods described in this description. In the embodiments of FIG. 3 and FIG. 4 described above, an operation of the BS 50 may be implemented by the processor 51.

A wireless device 60 includes a processor 61, a memory 62 and a RF unit 63. The memory 62 is operatively coupled with the processor 61 and stores a variety of commands to operate the processor 61. The RF unit 63 is operatively coupled with the processor 61, and transmits and/or receives a radio signal. The processor 61 is configured to implement proposed functions, procedures and/or methods described in this description. In the embodiments of FIG. 3 and FIG. 4 described above, an operation of the wireless device 60 may be implemented by the processor 61.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in the memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving data in a wireless communication system, the method comprising:
   receiving, by a wireless device, expansion subframe information indicating at least one expansion subframe in which an expansion modulation scheme is supported among a plurality of subframes;
   receiving, by the wireless device, downlink control information including a modulation and coding scheme (MCS) field on a downlink control channel,
   wherein the downlink control information schedules a downlink shared channel;
   determining, by the wireless device, a modulation order based on the received MCS field,
   wherein a first modulation order is determined when the expansion subframe information is configured, and a second modulation order is determined when the expansion subframe information is not configured; and
   receiving, by the wireless device, downlink data on the downlink shared channel using the determined modulation order.

2. The method of claim 1, wherein the expansion subframe information is specific parameter configured by a higher layer.

3. The method of claim 1, wherein the MCS field has different bit numbers in the expansion subframe and the non-expansion subframe.

4. The method of claim 1, wherein the MCS field has a same bit number in the expansion subframe and the non-expansion subframe.

5. The method of claim 1, wherein the expansion subframe supports a modulation scheme that has modulation order of 8, and non-expansion subframe, which is not the expansion subframe among the plurality of subframes, has a modulation order of less than 8.

6. The method of claim 1, wherein the expansion modulation scheme includes 256-quadrature amplitude modulation (QAM).

7. The method of claim 1, wherein the expansion subframe information includes information on a plurality of expansion frame sets, and each of the MCS tables is defined for each of the plurality of expansion frame sets.

8. The method of claim 7, wherein at least one of the MCS tables for the plurality of expansion frame sets is an expansion MCS table including the expansion modulation scheme, and
   wherein a channel quality indicator (CQI) table related to the expansion MCS table includes the expansion modulation scheme.

9. The method of claim 1, wherein the downlink data is received on a physical downlink shared channel (PDSCH) using the determined modulation order.

10. A wireless device in a wireless communication system, the wireless device comprising:
    a transceiver configured to transmit and receive a radio signal; and
    a processor connected to the transceiver,
    wherein the processor is configured to:
    receive expansion subframe information indicating at least one expansion subframe in which an expansion modulation scheme is supported among a plurality of subframes through the transceiver;
    receive downlink control information including a modulation and coding scheme (MCS) field on a downlink control channel,
    wherein the downlink control information schedules a downlink shared channel;

determine a modulation order based on the received MCS field, wherein a first modulation order is determined when the expansion subframe information is configured, and a second modulation order is determined when the expansion subframe information is not configured; and receive downlink data on the downlink shared channel using the determined modulation order.

11. The wireless device of claim 10, wherein the expansion subframe information is specific parameter configured by a higher layer.

12. The wireless device of claim 10, wherein the MCS field has different bit numbers in the expansion subframe and the non-expansion subframe.

13. The wireless device of claim 10, wherein the MCS field has a same bit number in the expansion subframe and the non-expansion subframe.

14. The wireless device of claim 10, wherein the expansion subframe supports a modulation scheme that has modulation order of 8, and non-expansion subframe, which is not the expansion subframe among the plurality of subframes, has a modulation order of less than 8.

15. The wireless device of claim 10, wherein the expansion modulation scheme includes 256-quadrature amplitude modulation (QAM).

16. The wireless device of claim 10, wherein the expansion subframe information includes information on a plurality of expansion frame sets, and each of the MCS tables is defined for each of the plurality of expansion frame sets.

17. The wireless device of claim 16, wherein at least one of the MCS tables for the plurality of expansion frame sets is an expansion MCS table including the expansion modulation scheme, and wherein a channel quality indicator (CQI) table related to the expansion MCS table includes the expansion modulation scheme.

18. The wireless device of claim 10, wherein the downlink data is received on a physical downlink shared channel (PDSCH) using the determined modulation order.

* * * * *